US005635963A

United States Patent [19]

Kuboki

[11] Patent Number: 5,635,963
[45] Date of Patent: Jun. 3, 1997

[54] IMAGE RECORDING APPARATUS CAPABLE OF PREVENTING JAMMING CAUSED BY FLOATING AT LAST LINE

[75] Inventor: Keiju Kuboki, Kawasaki, Japan

[73] Assignee: Canon Kabushiki Kaisha, Tokyo, Japan

[21] Appl. No.: 563,896

[22] Filed: Nov. 22, 1995

Related U.S. Application Data

[60] Continuation of Ser. No. 32,007, Mar. 16, 1993, abandoned, which is a division of Ser. No. 946,852, Sep. 18, 1992, Pat. No. 5,229,791, which is a division of Ser. No. 588,735, Sep. 27, 1990, Pat. No. 5,172,238, which is a continuation of Ser. No. 380,678, Jul. 14, 1989, Pat. No. 4,975,780, which is a continuation of Ser. No. 301,338, Jan. 25, 1989, abandoned.

[30] Foreign Application Priority Data

Jan. 29, 1988 [JP] Japan .................................. 63-17403

[51] Int. Cl.⁶ ........................ B41J 2/01; B41J 19/96
[52] U.S. Cl. ........................ 347/9; 400/582
[58] Field of Search ........................ 347/3, 8, 9, 14, 347/16, 104; 346/134, 136; 400/705, 705.3, 706, 709, 579, 582, 605

[56] References Cited

U.S. PATENT DOCUMENTS

| | | | |
|---|---|---|---|
| 4,463,361 | 7/1984 | Koumura et al. | 346/134 |
| 4,496,988 | 1/1985 | Moriguchi et al. | 358/296 X |
| 4,521,805 | 6/1985 | Ayata et al. | 358/296 X |
| 4,663,722 | 5/1987 | Sato | 400/605 |
| 4,664,544 | 5/1987 | Miyako et al. | 400/605 |
| 4,686,540 | 8/1987 | Leslie | 346/136 |
| 4,695,898 | 9/1987 | Ishikawa | 358/296 |
| 4,826,335 | 5/1989 | Kimura | 400/605 |
| 4,975,780 | 12/1990 | Kuboki | 358/296 |

FOREIGN PATENT DOCUMENTS 60-099680 6/1985 Japan ........................ 400/582

Primary Examiner—Benjamin R. Fuller
Assistant Examiner—Juanita Stephens
Attorney, Agent, or Firm—Fitzpatrick, Cella, Harper & Scinto

[57] ABSTRACT

An image recording apparatus for scanning a print head having a predetermined head print width a plurality of times in a main scanning direction and displacing an object to be recorded in a subscanning direction, thereby forming an image on the object, includes circuitry for calculating a print width formed at a last line, and for displacing the calculated print width before the last line and for reducing a suction area of the object on a platen at the time of printing of the last line. The apparatus includes a continuous rolled sheet supply and cutter and a stacked pre-cut sheet supply, both sheet supplies have a conveyor for feeding the respective sheet to a recording area. Recording is performed on the inside surface of the rolled sheet and on the lower surface of the cut sheet to avoid the problem of dust collecting on the opposing surfaces.

20 Claims, 14 Drawing Sheets

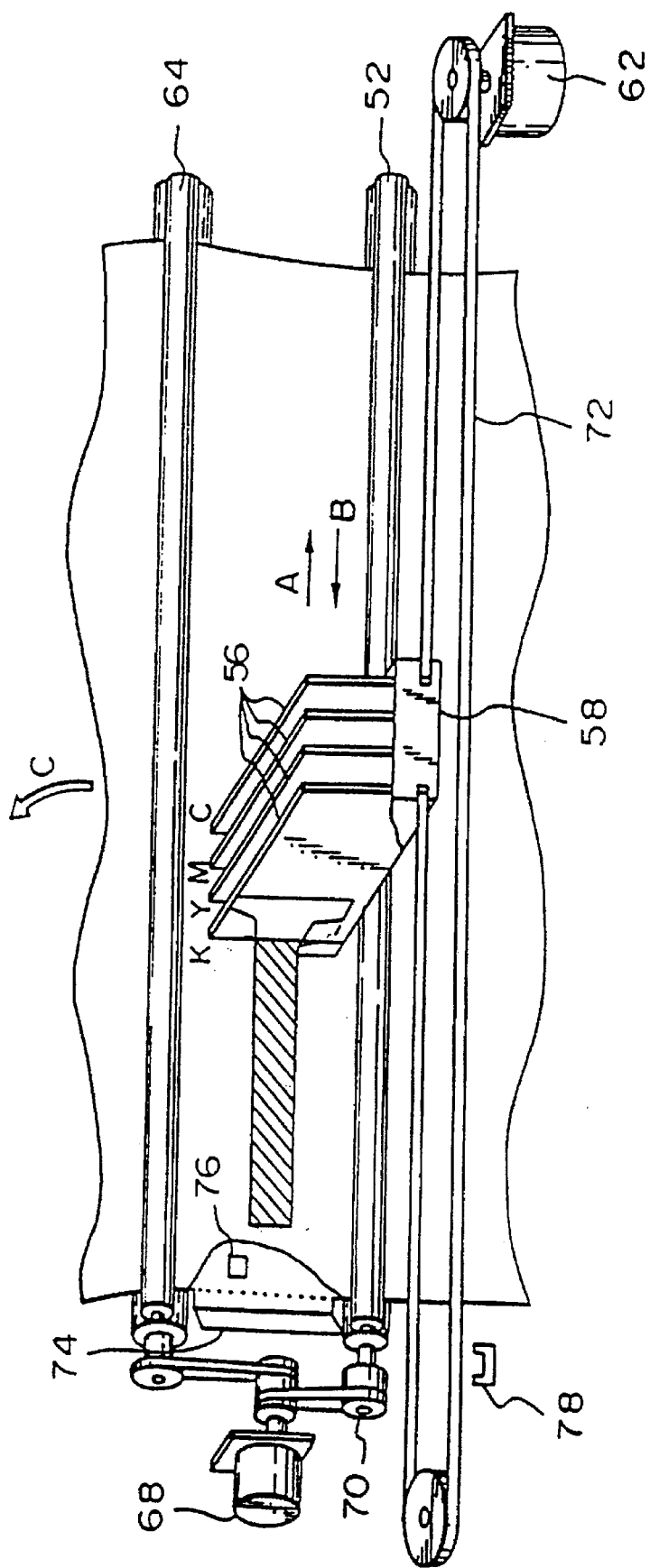

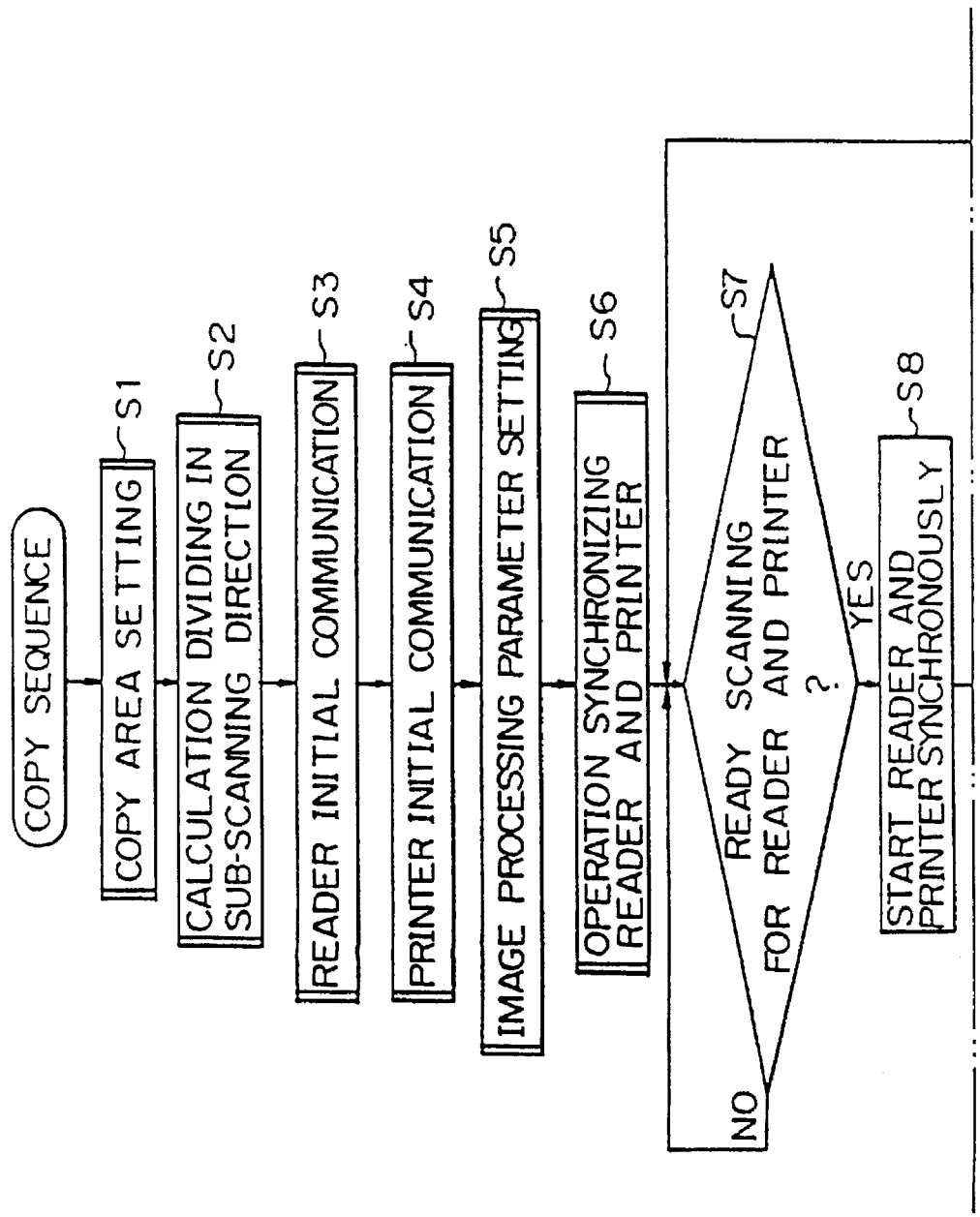

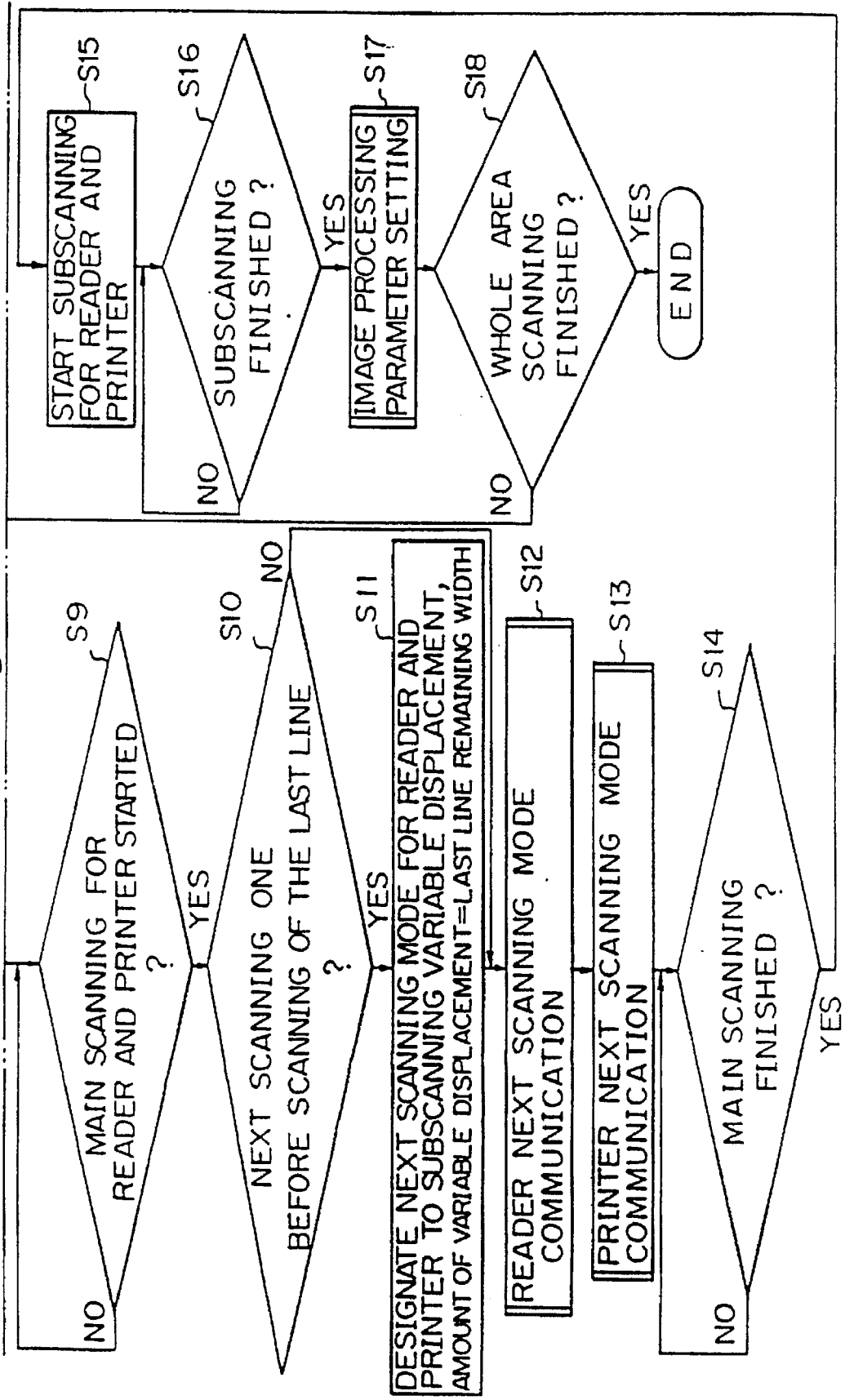

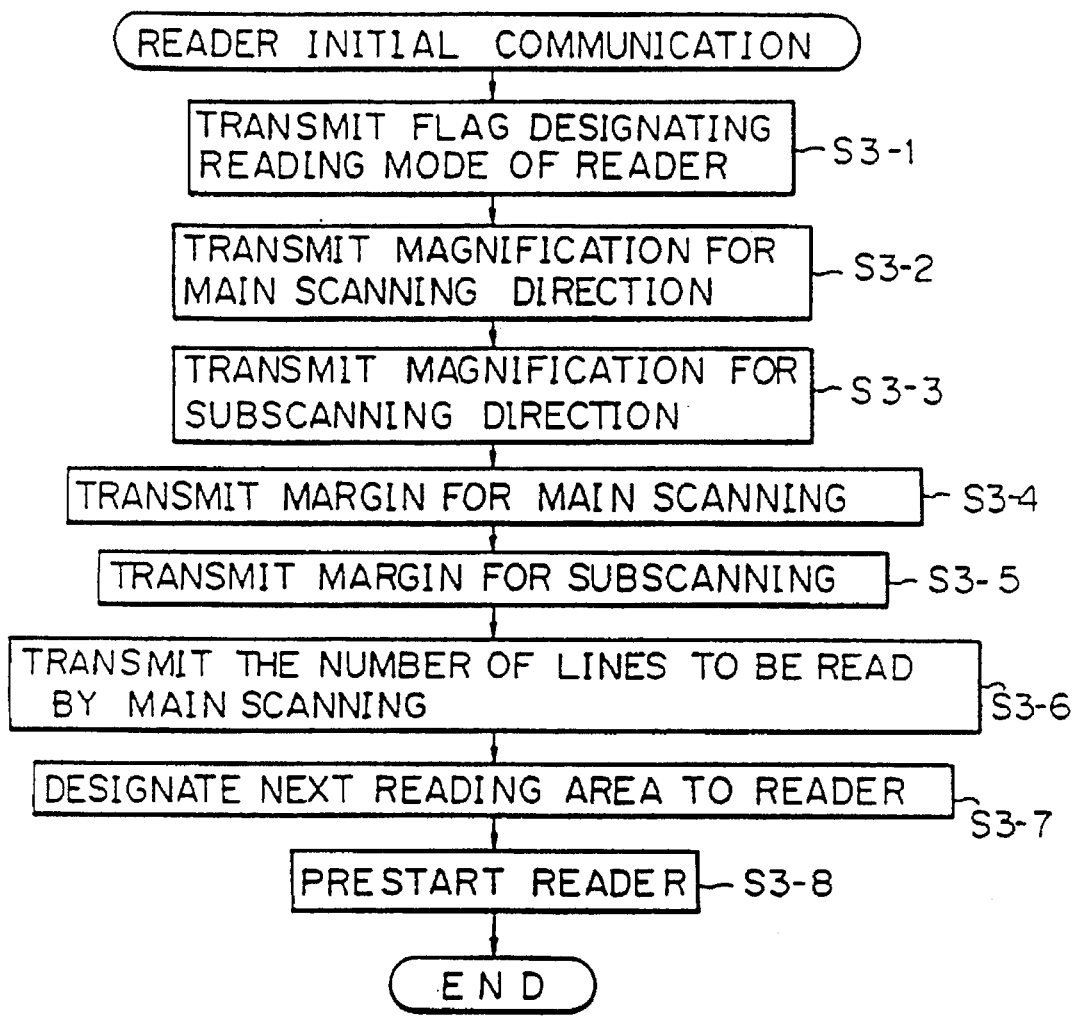

PRINTER NEXT SCANNING AREA MODE

| OPERATION CODE | $x_7$ | $x_6$ | $x_5$ | $x_4$ | $x_3$ | $x_2$ | $x_1$ | $x_0$ | AMOUNT OF SUBSCANNING VARIABLE DISPLACEMENT |
|---|---|---|---|---|---|---|---|---|---|

$x_7$: 0

$x_6$: 0 → COPY CONTINUATION
   1 → COPY END $x_2$: 0 → SUBSCANNING CONSTANT DISPLACEMENT
   1 → SUBSCANNING VARIABLE DISPLACEMENT $x_0$: 0 → SUBSCANNING
   1 → NO SUBSCANNING

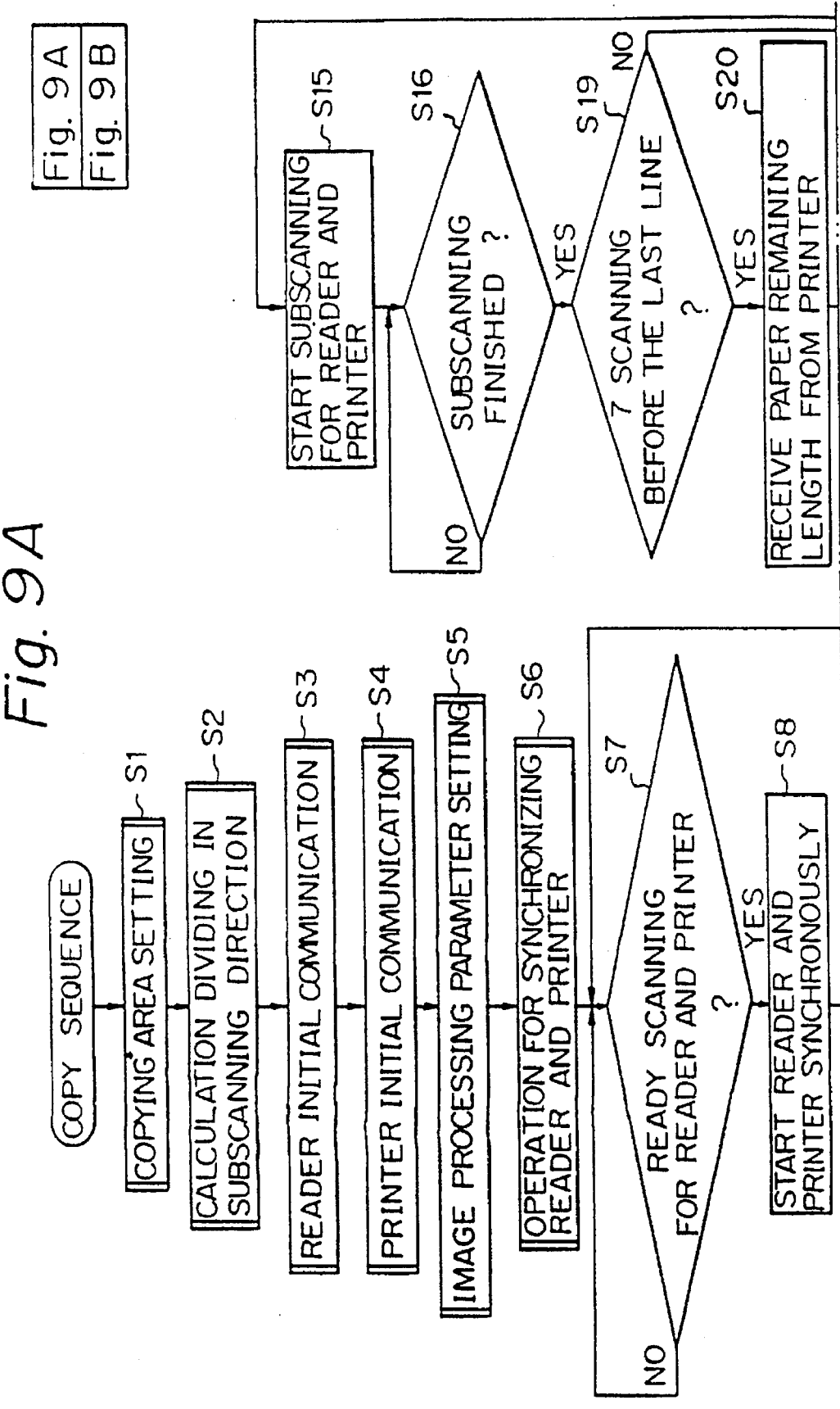

IMAGE RECORDING APPARATUS CAPABLE OF PREVENTING JAMMING CAUSED BY FLOATING AT LAST LINE

This application is a continuation of application Ser. No. 08/032,007, filed Mar. 16, 1993, abandoned, which is a divisional application of application Ser. No. 07/946,852, filed Sep. 18, 1992, U.S. Pat. No. 5,229,791, which is a divisional of application Ser. No. 07/588,735 filed Sep. 27, 1990, now U.S. Pat. No. 5,172,238, which is a continuation of application Ser. No. 07/380,678 filed Jul. 14, 1989, now U.S. Pat. No. 4,975,780, which is a continuation of application Ser. No. 07/301,338 filed Jan. 25, 1989, abandoned.

BACKGROUND OF THE INVENTION

1. Field of the Invention

The present invention relates to an image recording apparatus for scanning a printing head in a main scanning direction while moving an object to be printed in a subscanning direction, thereby forming an image.

2. Related Background Art

A conventional image recording apparatus for scanning a printing head in a main scanning direction while moving an object to be printed in a subscanning direction, thereby forming an image, has a printing portion, as shown in FIG. 11A. A platen 2 has suction holes 3 for chucking a sheet 1 as an object to be recorded. A suction pipe 4 is connected to the platen 2 to evacuate the platen 2 so as to chuck the sheet 1 through the holes 3. A printing head 5 is mounted on a head carriage 6 to oppose the platen 2. A sheet holder 7 holds the sheet 1 between the platen 2 and the printing head 5. The main scanning direction is a direction perpendicular to the drawing surface, and the subscanning direction is a vertical direction.

The plurality of suction holes 3 are distributed in the surface of the platen 2 within a print width of the printing head 5. The suction pipe 4 is connected to a suction pump (not shown). Upon operation of the suction pump, the inner space of the platen 2 is set to be a negative pressure, so that the sheet 1 can be chucked on the platen 2 through the suction holes 3. Therefore, floating of the sheet 1 on the platen 2 can be prevented. Chucking of the sheet through suction holes is known in the prior art (e.g., Japanese Patent Laid-Open (Kokai) No. 61-280964).

FIG. 11B shows a sheet suction position of the second to last line when a remaining subscanning length of the image area is divided by a print width of the printing heat 5. Referring to FIG. 11B, a hatched portion of the sheet 1 represents a printed portion. If an area in which the suction holes 3 are equidistantly formed within the print width along the subscanning direction is defined as X, and an area without the holes 3 and not overlapping the sheet holder 7 is defined as Y, condition X=Y is established.

A length Z of a portion (the lower end portion of the sheet 1) of the sheet 1 held by the sheet holder 7 is equal to a blank portion in which an image is not formed and represented by Z. In this manner, in a state wherein the lower end portion of the sheet 1 is kept held by the sheet holder 7, an upper portion of part of the sheet 1 which is located on the platen 2 is chucked by the suction holes 3, while its lower portion is held by the sheet holder 7. Therefore, floating of the sheet 1 on the platen 2 can be prevented.

FIG. 11C shows a printing position at which the last line is printed on the sheet 1. Although the blank portion Z is not chucked by the suction holes 3, floating of the blank portion Z almost never occurs because its width is about 2 mm. When printing of the last line and the second to last line is performed in the pattern described above, the sheet 1 having a floating lower end is not caught by the printing head 5 during its main-scanning movement.

However, the subscanning remaining length of the sheet is not necessarily divided by the head print width. A portion between the last printing line and the lower end of the sheet 1 may have a length smaller than the head print width X. In this case, in a state wherein the second to last line is to be printed, as shown in FIG. 12, the portion having the length smaller than the head print width X is removed from the sheet holder 7 and is not chucked by the suction holes 3. In this manner, the lower end of the sheet 1 is curled to cause trouble such as jamming.

It may be possible to shift the sheet holder 7 to the upper portion. However, it is actually difficult to shift it because of the shape of the printing head 5. It may also be possible to form the suction holes 3 throughout the entire area of the platen 2. However, power of the suction pump must then be increased, and the structure is complicated, and power consumption is undesirably increased. The portion having the length smaller than the head print width X may be assigned to the uppermost line. However, this proposal cannot cope with a manual paper feed mode in which a subscanning remaining length is discriminated near the last printing line.

SUMMARY OF THE INVENTION

It is an object of the present invention to solve the conventional problems described above and to provide an image recording apparatus which can prevent a trouble such as jamming caused by floating of an object subjected to printing without degrading printing quality.

It is another object of the present invention to prevent the object subjected to printing from floating on a platen at the last printing line in such a manner that a line defining a sheet portion having a length smaller than the head print width is set to be a line before the last scanning line.

The above and other objects, features, and advantages of the present invention will be apparent from the detailed description of preferred embodiments in conjunction with the accompanying drawings.

BRIEF DESCRIPTION OF THE DRAWINGS

FIG. 3 is a perspective view showing an arrangement around an operation carriage inside the image recording apparatus shown in FIG. 1;

FIG. 5, consisting of FIGS. 5A and 5B, is a flow chart showing a copy sequence when rolled paper or a cassette sheet is selected as recording paper;

FIG. 6A is a flow chart showing detailed procedures of a reader initial communication subroutine in the copy sequence;

FIG. 6B is a view showing a format of a next scanning area designation command for the reader;

DESCRIPTION OF THE PREFERRED EMBODIMENTS

An image recording apparatus according to an embodiment of the present invention will be described with reference to FIGS. 1 to 11C.

Figure 1:
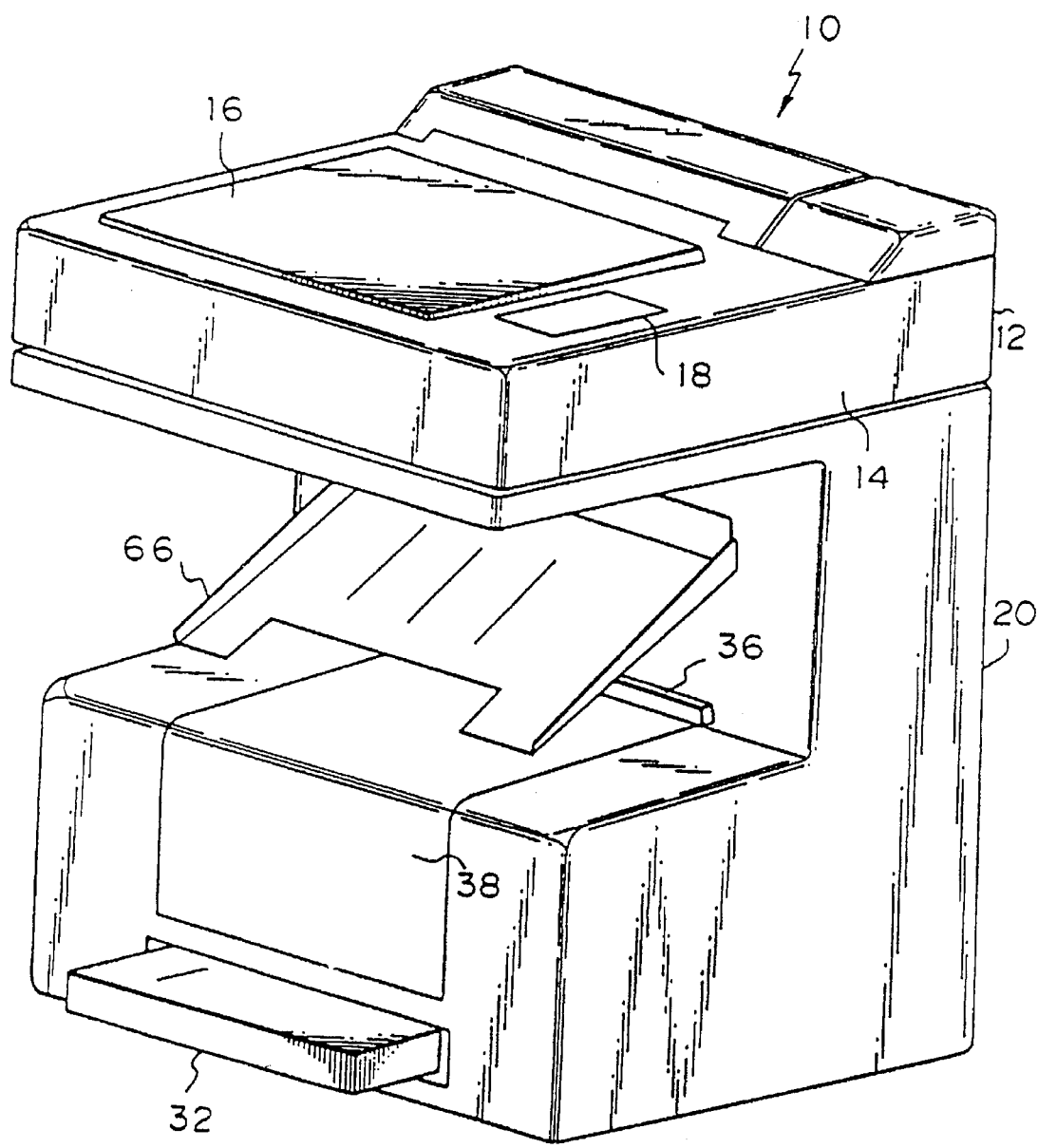
FIG. 1 is a schematic perspective view showing an arrangement of an image recording apparatus according to an embodiment of the present invention.

FIG. 1 shows an outer appearance of a digital color copying machine 10 which employs the image recording apparatus according to an embodiment of the present invention.

The digital color copying machine 10 mainly comprises two elements. More specifically, the copying machine 10 comprises a color image scanner (to be referred to as a reader hereinafter) 12 serving as an upper element for reading a full-color original image and outputting digital color image data. The reader 12 includes a controller portion 14 for performing various image processing operations of the digital color image data. The controller portion 14 has processing functions such as an interface function with an external device.

The reader 12 also includes a mechanism which is located below an original holding plate 16. This mechanism reads a stereoscopic or sheet-like original image of an original which faces down on an original table (not shown) and a large-size sheet-like original. An operation portion 18 is arranged at one side of the upper surface of the reader 12 and is connected to the controller portion 14. The operation portion 18 is arranged to input various pieces of information when the image recording apparatus serves as a copying machine.

The controller portion 14 is arranged to supply commands to the reader 12 and a printer 20 (to be described later) in accordance with information input through the operation portion 18. When complex editing processing and the like are required, a digitizer or the like is mounted in place of the original holding plate 16 and connected to the controller portion 14, thereby performing advanced image processing.

The copying machine 10 includes the printer 20 as the other main element. The printer 20 is located below the reader 12 to record color digital image signals from the controller portion 14 on recording paper. In this embodiment, the printer 20 comprises a full-color ink-jet printer using an ink bubble jet recording system, as described in Japanese Patent Laid-Open (Kokai) No. 54-59936.

The two main elements described above can be separated and can be separately installed and connected through a connection cable.

(Reader)

Figure 2:
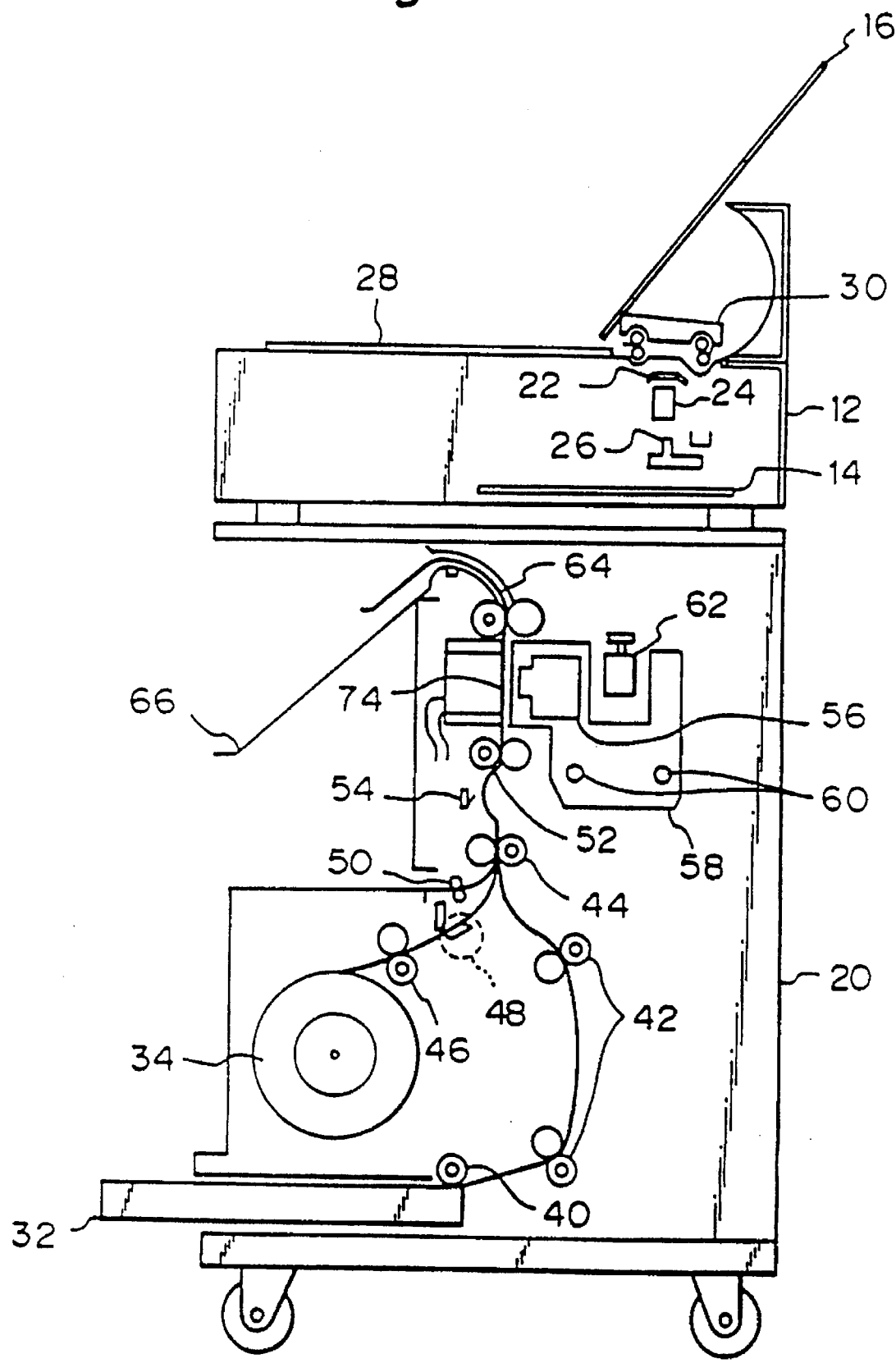
FIG. 2 is a schematic side sectional view showing an internal arrangement of the image recording apparatus shown in FIG. 1.

FIG. 2 is a schematic side sectional view showing an internal arrangement of the digital color copying machine 10 shown in FIG. 1.

In the reader 12 of the copying machine 10, an image of an original placed on an original glass table 28, an image from a projector, and an image of a sheet-like original fed by a paper feed mechanism 30 are read by an exposure lamp 22, a lens 24, and an image sensor 26 (a CCD sensor in this embodiment) capable of reading a full-color line image. Various image processing operations are performed by the reader 12 and the controller portion 14. The read image is recorded on recording paper at the printer 20.

(Printer)

Referring to FIG. 2, recording paper is selectively fed from a sheet cassette 32 for storing compact predetermined size (A4 to A3 sizes are available in this embodiment) sheets, and rolled paper 34 which is used to perform a large size recording (A2 to A1 sizes in this embodiment).

Recording sheets may be manually fed one by one from a manual insertion port 36 shown in FIG. 1 along a sheet cover 38, so that paper feeding (manual paper feeding) outside the copying machine can be performed. A pickup roller 40 is arranged above the sheet cassette 32 attached to the printer 20 to pick cut sheets one by one from the sheet cassette 32. Each cut sheet picked up by the pickup roller 40 is conveyed by cut sheet feed rollers 42 to first paper feed rollers 44.

The rolled paper 34 is continuously fed by rolled paper feed rollers 46 and is cut by a cutter 48 into a sheet having a predetermined size. The sheet is then conveyed to the first paper feed rollers 44. Similarly, a recording sheet inserted from the manual insertion port 36 is conveyed by manual paper feed rollers 50 to the first paper feed rollers 44.

The pickup roller 40, the cut sheet feed rollers 42, the rolled paper feed rollers 46, the first paper feed rollers 44, and the manual paper feed rollers 50 are driven by a paper feed motor (a DC servo motor in this embodiment) (not shown). ON/OFF control of the rollers is controlled by solenoid clutches attached to the corresponding rollers.

When a printing operation is started in response to a command from the controller portion 14, the sheet selected by any one of the paper feed paths is conveyed to the first paper feed rollers 44. In order to eliminate inclination (i.e., skew) of the recording sheet, a loop having a predetermined amount is formed in the recording sheet, and then the first paper feed rollers 44 are driven, so that the recording sheet is conveyed to second paper feed rollers 52.

A buffet is formed between the first and second paper feed rollers 44 and 52 to slacken the recording sheet so as to perform accurate paper feeding between paper feed rollers 64 located on the upstream side of a recording head 56 and the second paper feed rollers 52 located on the downstream side of the recording head 56. A buffer amount detection sensor 54 is arranged in the buffer to detect a buffer amount as a slackening amount of the recording sheet. The buffer is always formed in the recording sheet during sheet conveyance to reduce loads acting on the paper feed rollers 64 and the second paper feed rollers 52 during conveyance of a large size recording sheet, thereby achieving accurate sheet feeding.

In the printer 20 having the recording sheet conveying system therein, a scanning carriage 58 on which the recording head 56 is mounted is reciprocated by a scanning motor 62 along carriage rails 60, thereby performing main scanning. In the forward scanning cycle, an image is printed on the recording sheet by the recording head 56. In the backward scanning cycle, the recording sheet is fed by a predetermined distance by the paper feed rollers 64, thereby achieving subscanning feeding.

The subscanning feeding amount is defined as an amount of constant displacement. The amount of constant displacement is defined by a length corresponding to the subscanning width of the recording head 56, i.e., a length corresponding to the total width (not shown) of the suction hole area extending on the surface of a platen 74 opposite to the recording head 56. The suction holes are the same as those in a conventional suction mechanism described with reference to FIGS. 11A to 11C, and a detailed description thereof will be omitted.

In the forward scanning cycle, drive control of a driving system by the paper feed motor 62 is performed to always obtain a predetermined buffer amount while the buffer amount is kept detected by the buffer amount detection sensor 54.

The printed recording sheet is delivered onto a delivery tray 66, and a series of printing operations are completed.
(Arrangement Around Scanning Carriage)

An arrangement around the scanning carriage 58 will be described in detail with reference to FIG. 3.

Referring to FIG. 3, a paper feed motor 68 is arranged as a drive source for intermittently driving the recording sheet in the subscanning direction. An angular displacement of the paper feed motor 68 can be arbitrarily set or changed. The paper feed motor 68 drives the paper feed rollers 64 and the second paper feed rollers 52 through a second roller clutch 70.

The scanning motor 62 serves as a drive source for scanning the scanning carriage 58 through a scanning belt 72 in main scanning directions indicated by arrows A and B. In this embodiment, the paper feed motor 68 and the scanning motor 62 comprise pulse motors since accurate sheet feeding control with an arbitrary feeding amount is required.

Figure 11A:
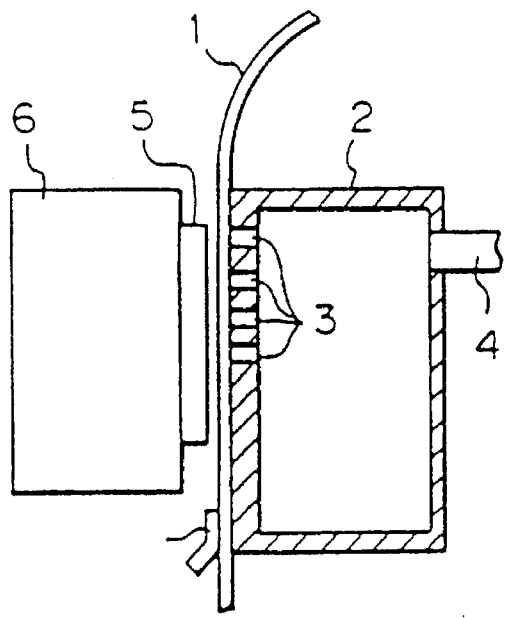
FIG. 11A is a schematic side view showing a printing state of a recording sheet in a conventional image recording apparatus.
Figure 11B:
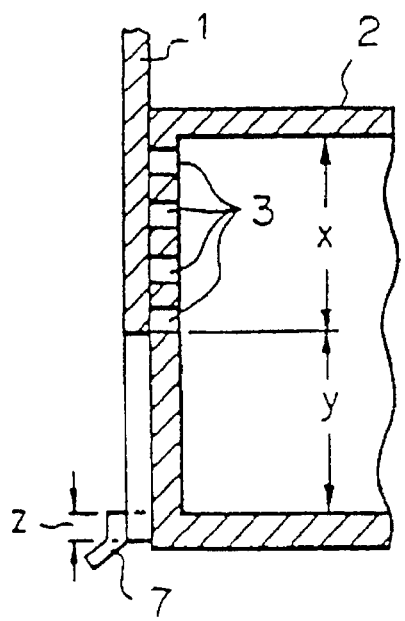
FIG. 11B is a side view showing a state wherein the lower end of the recording sheet is held by a sheet holder.
Figure 11C:
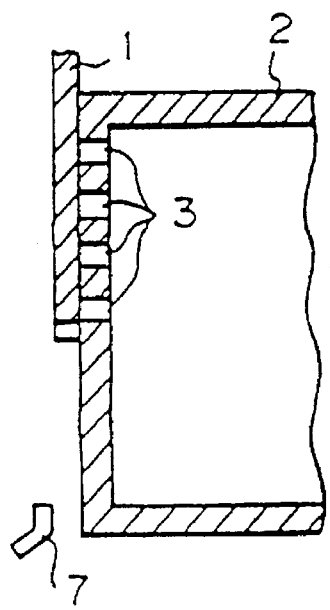
FIG. 11C is a side view showing a state wherein the last line is being printed from the state shown in FIG. 11B.

In this embodiment, a sheet holding member (not shown) as in the conventional one described with reference to FIG. 11B is arranged at a position opposite to the lower end of the platen 74.

When the recording sheet reaches the second paper feed rollers 52, the second paper feed roller clutch 70 and the paper feed motor 68 are turned on. The recording sheet is conveyed along the platen 74 until a leading end of the recording sheet is clamped by the pair of paper feed rollers 64. A sheet detection sensor 76 arranged on the platen 74 detects that the recording sheet has passed along the platen 74. Sensor information is used for position control and jam control.

When the leading end of the recording sheet reaches the rollers 64, the second paper feed roller clutch 70 and the paper feed motor 68 are turned off. An inner space of the platen 74 is evacuated to be a negative pressure upon operation of a suction motor (not shown), thereby starting a suction operation. By this suction operation, the recording sheet is brought into tight contact with the platen 74.

Prior to an image printing operation on the recording sheet, the scanning carriage 58 is moved to a position where a home position sensor 78 is arranged. Forward scanning is performed along the direction indicated by arrow A. In the forward scanning cycle, inks of cyan (C), magenta (M), yellow (Y), and black (K) are injected from predetermined positions of the recording head 56, thereby recording (printing) a full-color image.

When an image recording operation is completed by a predetermined main-scanning length, the drive direction of the scanning motor 62 is reversed to move the scanning carriage in the direction indicated by arrow B. The scanning motor 62 is operated until the scanning carriage 58 returns to the position of the home position sensor 78. During this backward scanning cycle, upon operation of the paper feed motor 68 and rotation of the paper feed rollers 64, the recording sheet is fed by a subscanning direction length corresponding to the width of the portion recorded with the recording head 56 (i.e., the width of the recording head 56). Therefore, the recording sheet is fed in only a subscanning direction indicated by arrow C.

The above-mentioned feeding amount, i.e., an amount of subscanning displacement is not always limited to the width of the recording head 56, i.e., the amount of constant displacement, but may be defined by an amount of variable displacement defined by a last line width.

In this embodiment, the recording head 56 comprises ink-jet nozzles of the type described above, and 256 nozzles are assembled for each of Y, M, C, and K components.

When the scanning carriage 58 is stopped at the home position defined by the home position sensor 78, a recovery operation of the recording head 56 is performed. This recovery operation is performed to perform a subsequent stable recording operation. In order to prevent irregular ink injection timings caused by changes in viscosities of the inks left in the nozzles of the recording head 56, pressure is applied to each nozzle of the recording head under the programmed conditions such as sheet feeding time, temperature inside the copying machine, and ink-jet time, and compressed air is injected from each nozzle.

The above operations are repeated to form an image on the entire surface of the recording sheet.
(System Configuration)

Image signal processing and control of a control system in the digital color copying machine 10 of this embodiment will be described with reference to FIGS. 4A to 4C.

Figure 4A:
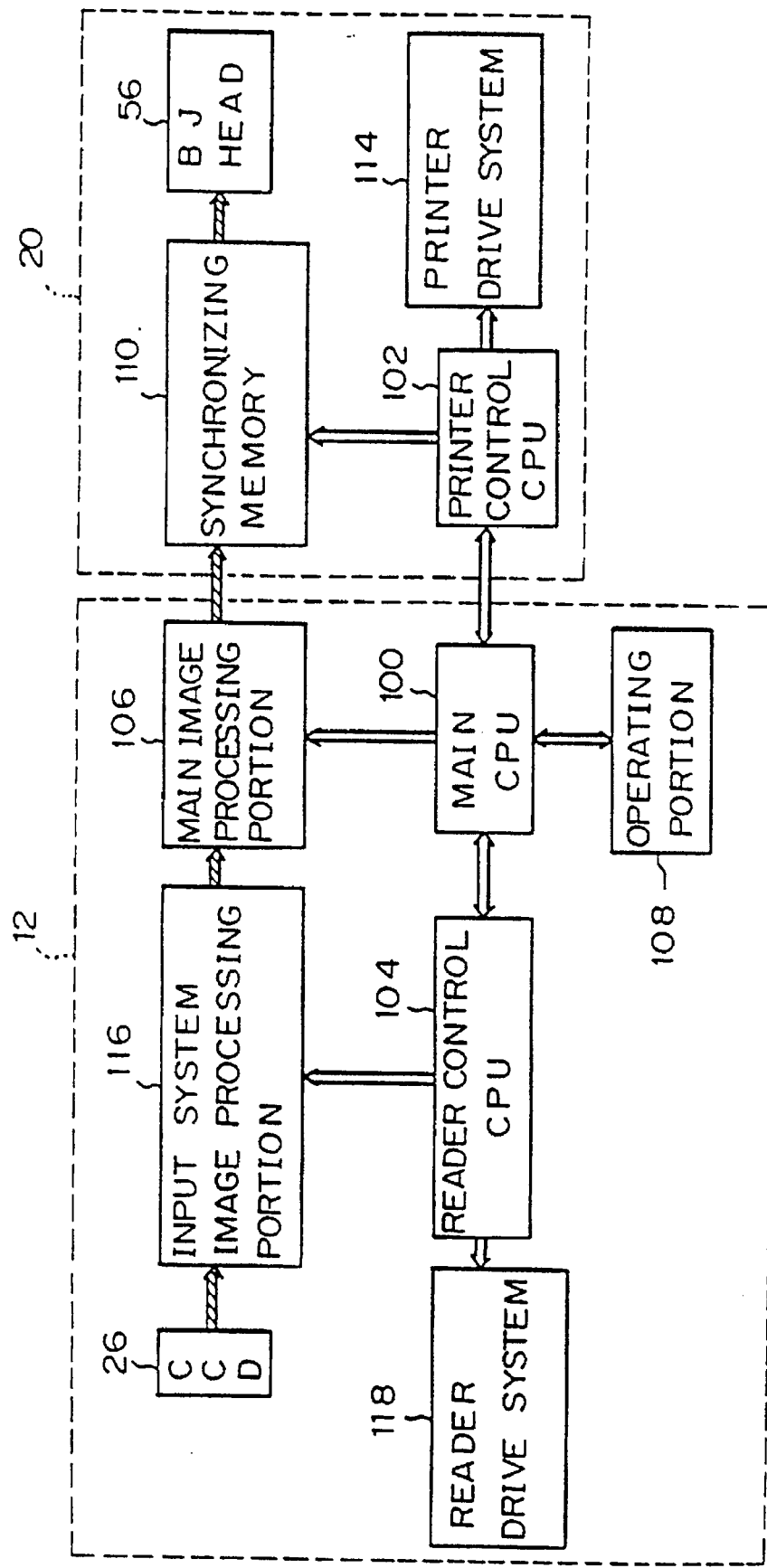
FIG. 4A is a schematic block diagram showing a control system of the image recording apparatus shown in FIG. 1.
Figure 4B:
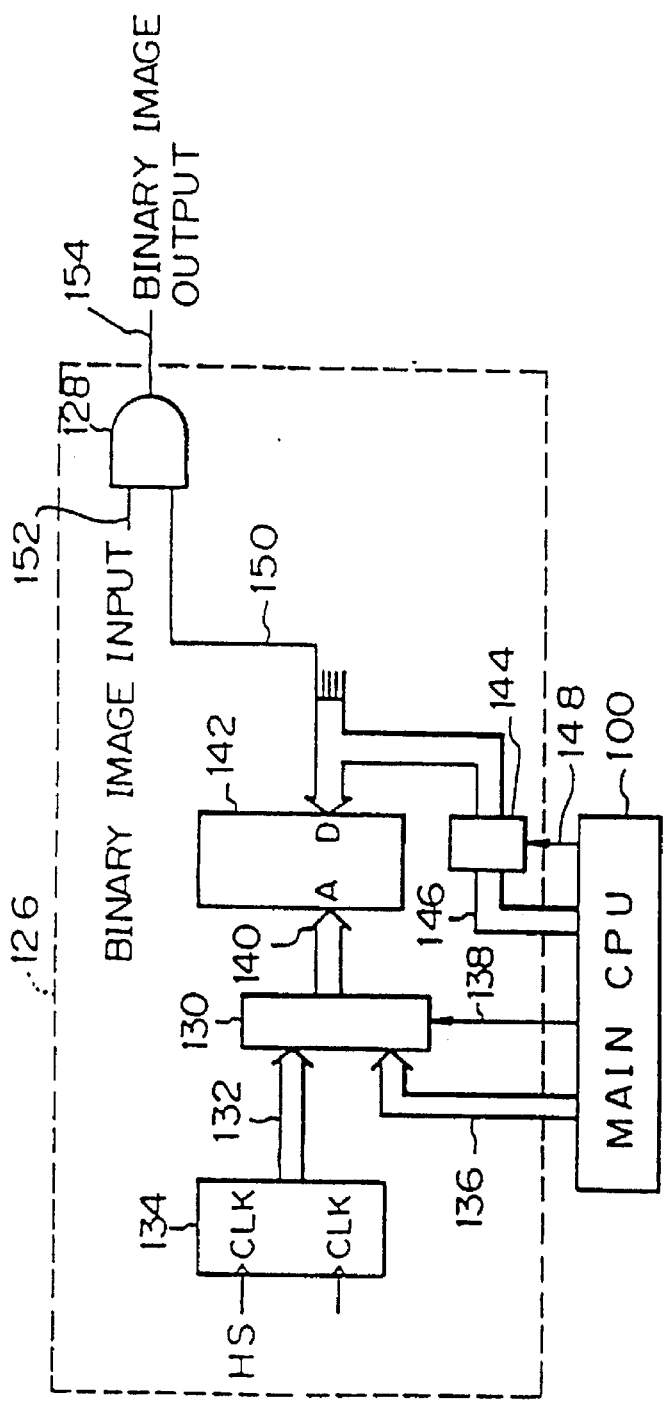
FIG. 4B is a block diagram showing an arrangement of an image trimming portion associated with a characteristic feature of the present invention in a main image processing portion.
Figure 4C:
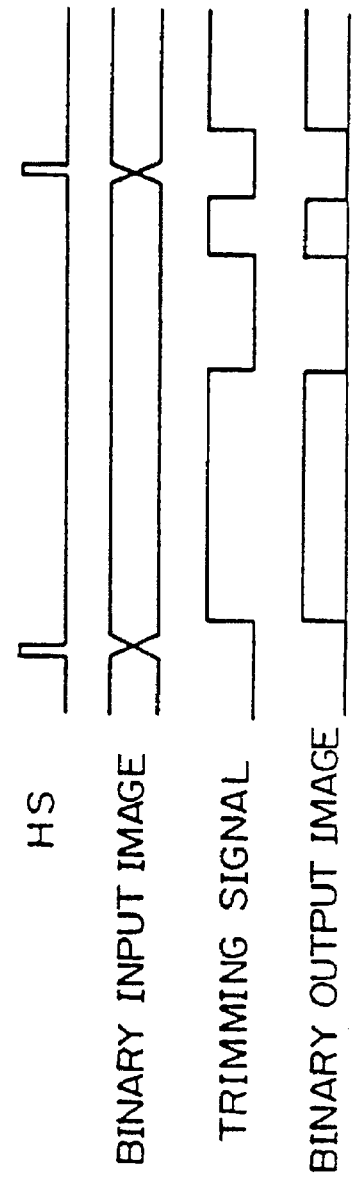
FIG. 4C is a timing chart showing a trimming state of binary image input data.

Referring to FIG. 4A, a main CPU 100 serves as a main controller for controlling the overall Operation of the copying machine. The main CPU 100 is connected to a printer control CPU 102 for controlling an operation of the printer, a reader control CPU 104 for controlling a reading operation, a main image processing portion 106 for processing an image display operation, and an operation portion 108 serving as an input portion manipulated by an operator. The printer and reader control CPUs 102 and 104 control the printer and reader operations, respectively, and serve as slave CPUs with respect to the main CPU 100 which serve as a master CPU.

The main image processing portion 106 performs processing such as edge emphasis, smoothing, masking, black extraction, binarization, and trimming. The printer control CPU 102 and the main image processing portion 106 are connected to a synchronizing memory 110. The synchronizing memory 110 absorbs time variations of input operations and corrects delay on the mechanism of the recording head. The synchronizing memory 110 is connected to the recording head 56 as an ink bubble jet head. The printer control CPU 102 is connected to a printer drive system 114 for controlling input driving of the printer.

The reader control CPU 104 is connected to an input system image processing portion 116 for performing necessary correction operations in the reading systems such as a shading correction system, a color correction system, and a gamma-correction system, and a reader drive system 118 for controlling input driving of the reader. The CCD line sensor 26 is connected to the input system image processing portion 116, and the input system image processing portion 116 is connected to the main image processing portion 106.

The reader 12 is constituted by the main CPU 100, the reader control CPU 104, the main image processing portion 106, the operation portion 108, the input system image processing portion 116, the reader drive system 118, and the CCD line sensor 26 serving as an image sensor. The printer 20 is constituted by the printer control CPU 102, the synchronizing memory 110, the recording head 56, and the printer drive system 114.

An arrangement of an image trimming portion 126 associated with a characteristic feature of the present invention in the main image processing portion 106 will be described with reference to FIG. 4B.

The image trimming portion 126 performs trimming by gating binary input data to an AND gate 128. The image trimming portion 126 is connected at the final stage of the main image processing portion 106. As shown in FIG. 4B, the image trimming portion 126 comprises an address signal switching multiplexer 130. The multiplexer 130 is connected to an address counter 134 through an address line 132 and to the main CPU 100 through an address bus line 136. An address bus enable signal 138 is input from the main CPU 100 to the multiplexer 130.

The multiplexer 130 is connected to an editing RAM 142 through an address line 140. The image trimming portion 126 further includes a data bus gate 144. The data bus gate 144 is connected to the main CPU 100 through a data bus line 146. A data bus enable signal 148 is input from the main CPU 100 to the data bus gate 144. A trimming signal 150 is one of the outputs from the editing RAM 142. A serial binary image input signal 152 is input to the AND gate 128, and the AND gate 128 generates an output signal 154.

The address counter 134 receives a signal CSEL corresponding to one frame and is cleared every HS (Hsync) period. The signal CSEL serves as a clock signal. A sync signal HS is generated at the beginning of CCD scanning. As shown in FIG. 4C, the data bus enable signal 148 and address bus enable signal 138 are enabled every scanning, and predetermined data is written from the main CPU 100. Therefore, image subscanning trimming can be performed. A description of other outputs except for the trimming signal 150 from the editing RAM 142 will be omitted.

In the control system having the above arrangement, an image input from the CCD line sensor 26 is corrected by the input system image processing portion 116, and the corrected data is sent to the main image processing portion 106.

The data is then processed by the processing portion 106 into binary data. The binary image data is supplied to the synchronizing memory 110 in the printer 20. The image data synchronized by the synchronizing memory 110 is sequentially printed on the recording sheet by the recording head 56.

(Control Operation)

The procedure contents of the copy sequence closely associated with the characteristic feature of the present invention and executed by the main CPU 100, the printer control CPU 102, and the reader control CPU 104 will be described with reference to FIGS. 5 to 8B.

First, rolled paper and cut sheets are selected as recording paper.

Figure 7A:
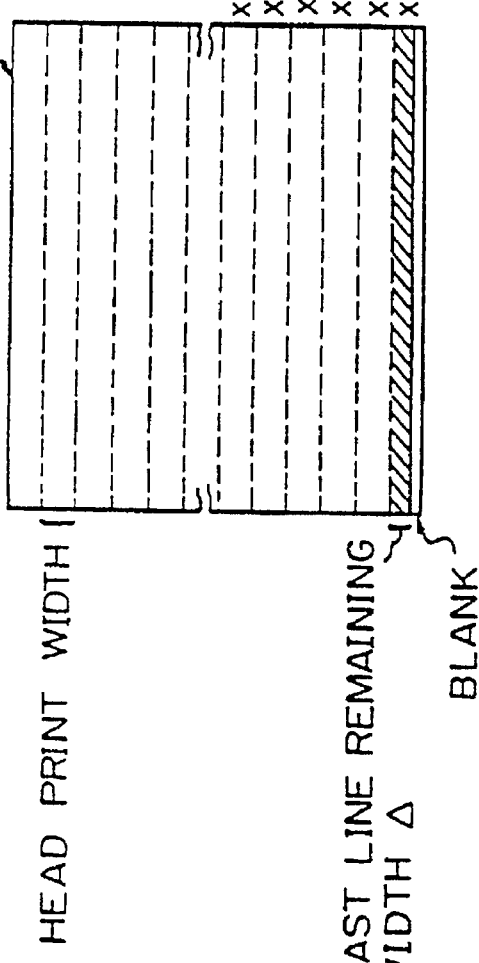
FIG. 7A is a plan view showing a state wherein a remaining width A below the last line is formed in the copying area set on the recording paper.
Figure 7B:
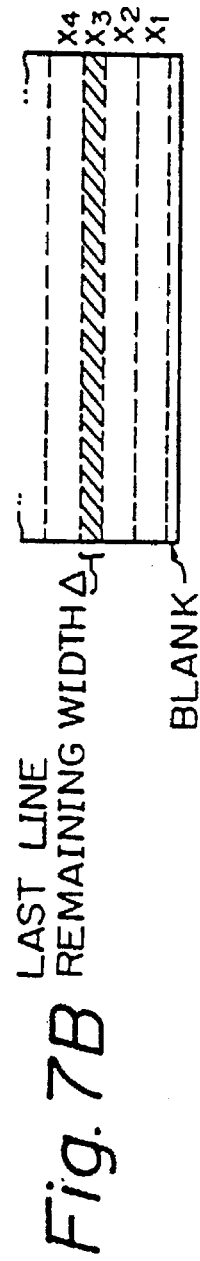
FIG. 7B is a plan view showing a state wherein the remaining width A shown in FIG. 7A is moved two lines before the last line.
Figure 7C:
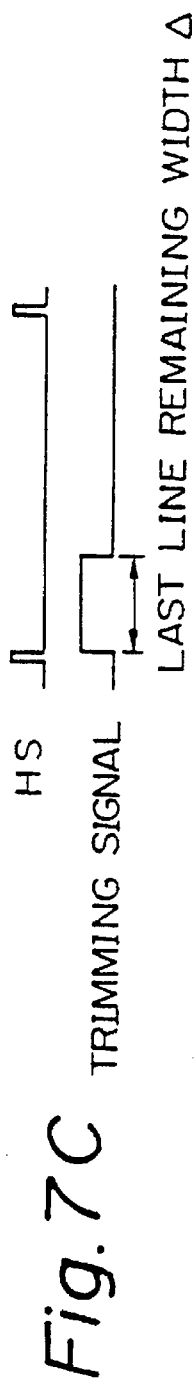
FIG. 7C is a timing chart showing an output timing of a trimming signal.

When a start key in the operation portion 108 (FIG. 4A) is depressed, a copy sequence task is accessed, and processing is started. In step S1, a copying area is set in accordance with data such as an original size, a main scanning magnification, a subscanning magnification, and a paper size which are set at the operation portion 108. In step S2, the area set in step S1 is divided by every head print width in the subscanning direction, as shown in FIGS. 7A to 7C, so that the number of subscanning scanning cycles and the remaining width A as the last line print width are calculated. In step S3, data necessary for initialization is transmitted to the reader control CPU 104. That is, initial communication to the reader 12 is executed.

FIG. 6A shows the reader initial communication in detail. More specifically, in step S3-1, a flag designating a reading mode of the reader is transmitted. This flag represents information of a reflecting system original, a projector, an erect or mirror image, or a negative or positive image. In step S3-2, a magnification for the main scanning direction is transmitted. In step S3-3, a magnification for the subscanning direction is transmitted. In step S3-4, a margin for main-scanning is transmitted, and in step S3-5, a margin for subscanning is transmitted. In step S3-6, the number of lines to be read by main scanning is transmitted. In step S3-7, a next reading area is designated to the reader. In other words, a reader next scanning area designating command is transmitted in this step.

This command is described with reference to FIG. 6B in detail. The command comprises 3-byte data. The first byte represents an operation code which represents the main command portion. The second byte represents a reader next scanning area mode flag in which bit 7 is set at logic "1" at the end of copying operation and logic "0" for copy continuation. In this flag, bit 6 is set at logic "0" for subscanning constant displacement designated by the head print width and the magnification after the next scanning and logic "1" for subscanning variable displacement. Bits 3 to 0 represent area numbers to be scanned next and are used to scan a plurality of areas as in image synthesis. For the sake of simplicity, an area to be scanned is limited to one.

The third byte represents an amount of subscanning variable displacement and particularly an amount of variable displacement when bit 6 of the second byte is set at logic "1". The amount of variable displacement is defined as the remaining width Δ as the last line print width calculated in step S2.

In step S3-8, the prestart command is transmitted, and the reader control CPU 104 performs initialization in response to the prestart command.

By the operations described above, the initial communication to the reader 12 in step S3 of FIG. 5 is completed.

Figures 8A, 8B:
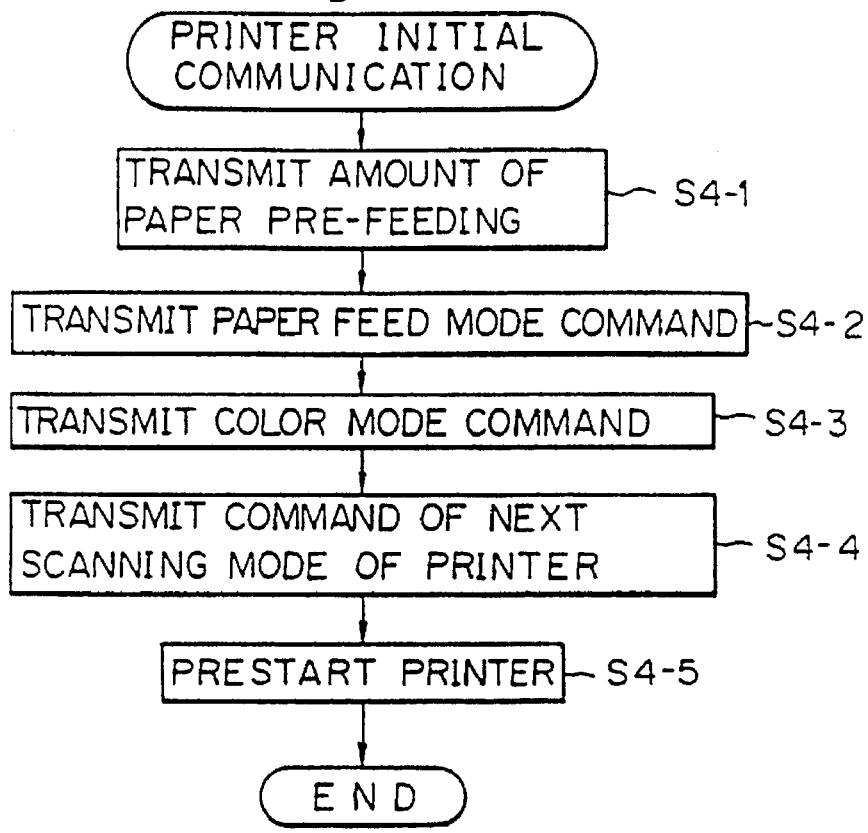
FIG. 8A is a flow chart showing detailed procedures of a printer initial communication subroutine in the copy sequence.
FIG. 8B is a view showing a format of a printer next scanning area designation command.

In the copy sequence described above, in step S4 after step S3, data necessary for initialization of the printer control CPU 102 is transmitted, as shown in FIG. 8A in detail.

In step S4-1, an amount of paper pre-feeding is transmitted. This is very effective when an image is printed from a lower portion from the uppermost end in the subscanning direction. In step S4-2, a paper feed mode command which represents rolled paper, a cassette sheet, or a manual feed sheet is transmitted. In step S4-3, a color mode command is transmitted. The color mode command gives information representing which one of the C, M, Y, and K heads is enabled. In a normal state, all color heads are enabled. In step S4-4, a command of a next scanning mode of the printer is transmitted.

The command of the next scanning mode of the printer is shown in FIG. 8B in detail. This command consists of 3 bytes. The first byte of the command is an operation code for specifying the command. The second type is a printer next scanning area mode flag. Communication error information is added to bit 7 of the second type and is normally set at logic "0". Bit 6 is set at logic "0" for copy continuation after the next scanning and logic "1" for a copy end. Bit 2 designates subscanning constant displacement or subscanning variable displacement and is equivalent to that of the reader next scanning area mode flag. Bit 0 is set at logic "0" for subscanning after the next scanning and logic "1" for "no subscanning". Bit 0 is used for size reduction or the like.

The third byte of the command represents an amount of subscanning variable displacement and is equivalent to that of the reader scanning area designating command. That is, the amount of subscanning variable displacement is defined by the last line remaining width $\Delta$ as the last line print width.

In step S4-5, a printer prestart signal is transmitted. In response to this, the printer 20 starts initialization.

The initial communication to the printer 20 in step S4 shown in FIG. 5A is completed, and the flow advances to step S5.

In step S5, image processing parameters such as edge emphasis, smoothing, masking, and binary parameters are set, and at the same time, the editing RAM 142 is also set. In step S6, scanning start time of the reader 12 and the printer 20 is determined so as to perform an operation for synchronizing the reader 12 and the printer 20. In step S7, the end of initialization operations such as shading correction and paper feed in the reader 12 and the printer 20 are awaited in step S7. When both the reader 12 and the printer 20 are ready in step S7, the start signal is transmitted in step S8 on the basis of the calculated start times in step S6. When the start of the main-scanning operation of the reader 12 and the printer 20 is detected, the flow advances to step S10.

In step S10, it is determined whether the next scanning line is two lines before the last line, in other words, the third to last line. If NO in step S10, the flow advances to reader next scanning mode communication in step S12, and then printer next scanning mode communication in step S13. These steps are equivalent to step S3-7 in FIG. 6A and step S4-4 in FIG. 8A. In these cases, subscanning displacement is designated.

When main scanning is finished in step S14, subscanning for the reader and the printer, i.e., paper feeding, is started in step S15. In step S16, the end of subscanning is awaited. When subscanning is ended, one-line scanning is ended. Thereafter, the image processing parameters are set for next scanning in step S17. It is then determined in step S18 whether scanning of the whole area is finished. If NO in step S18, the flow returns to step S7. However, if YES in step S18, the control operation is ended.

If YES in step S10, i.e., the next scanning line is determined to be located two lines before the last line, the flow advances to step S11. Since the next scanning (i.e., the scanning line located two lines before the last line) is given with the last line remaining width $\Delta$, i.e., since printing is performed by the last line remaining width $\Delta$ in the next scanning, the next scanning modes of the reader 12 and the printer 20 are set to be subscanning variable displacement. In this case, the last line remaining width $\Delta$ is designated as an amount of variable displacement. This information is transmitted to the reader control CPU 104 and the printer control CPU 102, respectively, in steps S12 and S13.

When main scanning of this line is completed in step S14, subscanning of this line is executed in steps 15 and 16. The image processing parameters are set in step S17 so that the trimming signal from the editing RAM 142 sets the image to be effective by the last line remaining width $\Delta$ from the beginning of the image, as shown in FIG. 7A. In the next scanning operation, as indicated by reference symbol $X_3$ in FIG. 7B, printing is performed by only the last line remaining width $\Delta$. At the end of main scanning of the $X_3$ line, subscanning is performed by the last line remaining width $\Delta$. As a result, the recording sheet is displaced to the next line, i.e., to the position $X_2$.

The print remaining width in the last two scanning operations (i.e., scanning operations for performing printing on the last line $X_1$ and the second to last line $X_2$) is the same as that in the case wherein the image length is divided by the width of the recording head 56 in the subscanning direction. In main scanning of the $X_2$ line, the blank portion at the lower end portion of the recording sheet is kept held by a paper holder (not shown). In main scanning of the $X_2$ line, a printed portion of the recording sheet is firmly held on the platen 74 through a suction mechanism (not shown). At the same time, the lower end of the recording sheet is held by the paper holder. Therefore, floating of the recording sheet from the platen 74 can be prevented.

In subscanning of the $X_2$ line, Constant displacement is performed. At the end of this subscanning, the last $X_1$ line opposes the recording head 56, and at the same time, the blank portion in the lower part of the recording sheet slightly falls outside the suction area. That is, in main scanning of the last $X_1$ line, the printed portion of the $X_1$ line of the recording sheet is in tight contact with the platen 74, and the blank portion is not chucked. However, since the blank portion has length of about 2 mm, trouble such as jamming caused by floating of the sheet can be prevented.

The above copy sequence is performed when the rolled paper or cassette sheet is selected as the recording paper. A copy sequence of a manually fed sheet will be described with reference to FIG. 9.

In the manual paper feed copy sequence, a paper size is set at the operation portion. However, the value set at the operation portion does not necessarily coincide with the actual size. For this reason, when the actual size is smaller than the set size, printing undesirably continues on the platen even after the sheet leaves the platen. In order to prevent this drawback, the remaining paper length is detected by a sensor at a position seven scanning lines before the last line.

Figure 9B:
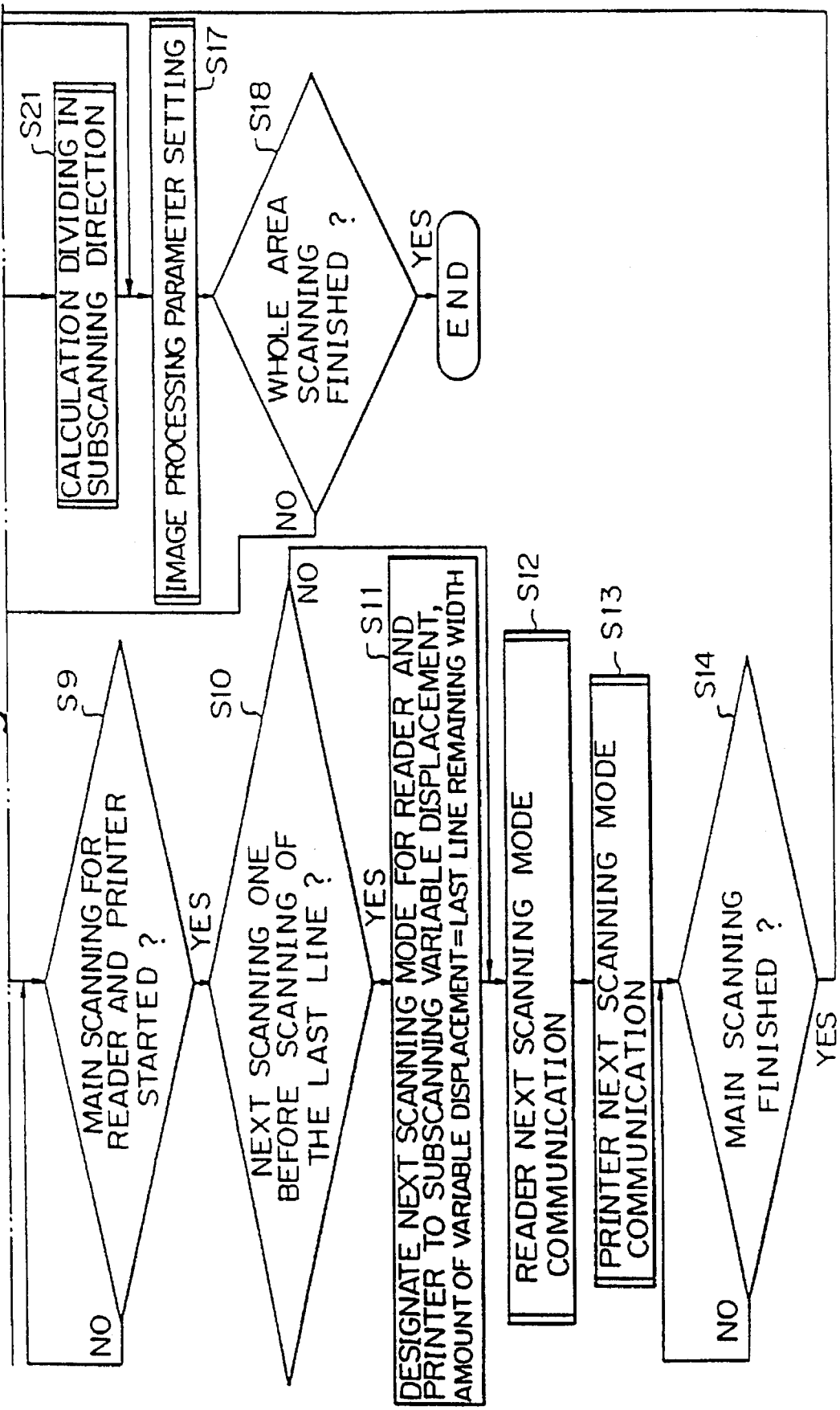
FIG. 9, consisting of FIGS. 9A and 9B, is a flow chart showing a manual paper feed copy sequence.

In the manual paper feed copy sequence, the number of remaining scanning cycles and the last line remaining width $\Delta$ are calculated at this detection position. Referring to FIG. 9A, a copying area is set in step S1. In step S2, a calculation for dividing the length in the subscanning direction is performed. This calculation is an intermediate calculation. The operations up to step S14 are the same as in FIG. 5B in which the rolled paper or cassette sheet is selected as the recording paper, and a detailed description thereof will be omitted.

Step S19 is executed after step S16. If YES in step S19, that is, the line position is detected as a position seven scanning lines before the last line, the flow advances to step S20. The remaining paper length information is received from the printer 20. In step S21, calculation dividing in the subscanning direction is performed again. The operations after step S21 are the same as those in steps S17 and 18 in FIG. 5. If NO in step S19, i.e., if the line position is not the one seven scanning lines before the last line, the flow jumps to step S17.

In this embodiment, even if manual paper feed which does not allow designation of a paper size is performed, the $X_1$ line is chucked on the platen and the blank portion is not chucked during scanning of the last line. Since the blank portion has a length of about 2 mm, trouble such as jamming caused by floating of the paper can be prevented. Manual feed operation can be effectively performed in the same manner as in the case wherein the rolled paper or cassette sheet is selected as the recording paper.

The present invention is not limited to the particular embodiment described above. Various changes and modifications may be made without departing from the spirit and scope of the invention.

Figure 10A:
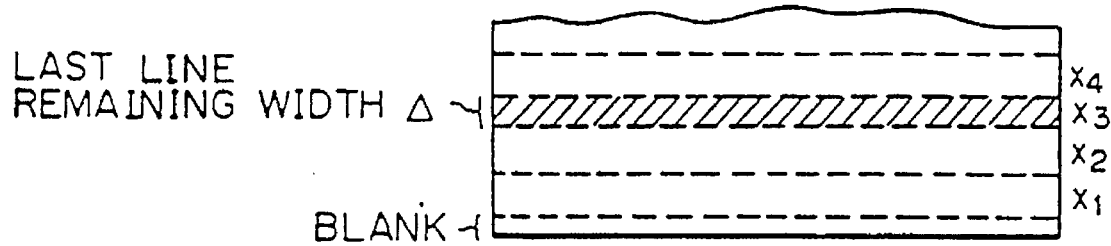
FIG. 10A is a plan view showing a state wherein a last line remaining width A is moved three lines before the last line in a copy sequence according to another embodiment of the present invention.
Figure 10B:
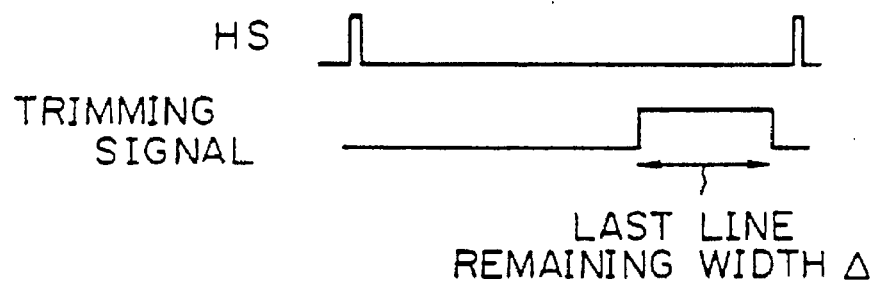
FIG. 10B is a timing chart showing an output timing of a trimming signal when the copy sequence shown in FIG. 10A is performed.
Figure 12:
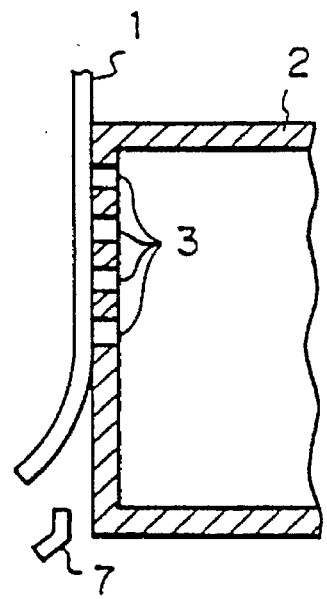
FIG. 12 is a side view showing a state wherein the lower end of the recording sheet is removed from the sheet holder during printing of the last line in the conventional image recording apparatus.

For example, the present invention may be arranged as another embodiment of FIGS. 10A and 10B. As shown in FIG. 10A, subscanning after scanning of the $X_4$ line which is four lines ahead of the last line is performed by variable displacement. A trimming signal for scanning of the $X_3$ line which is three lines ahead of the last line is set such that an image effective area is assigned to the lower portion of the recording head 56, thereby performing printing for the last line remaining width Δ.

In this second embodiment, unlike the first embodiment in which the remaining portion is printed from the upper portion of the recording head 56, printing is started from the lower portion of the recording head 56. In this manner, a portion of the recording head 56 which is to be used and the start position of subscanning variable displacement in association with the portion of the recording head 56 which is to be used are not limited to the specific ones.

In the first embodiment, the position at which the last line remaining width Δ is printed is not limited to the line which is two lines ahead of the last line. As long as subscanning constant displacement can be performed on the last two lines, the position at which the last line remaining width Δ is not limited to any specific position and can be any line if the position is two or more lines ahead of the last line.

In the above embodiment, the same relationship as in the prior art with respect to the subscanning width of the platen 74, the suction area width of the recording sheet, and the position of the paper holder is employed. The position at which the last line remaining width Δ is printed must be the one which is two or more scanning lines ahead of the last line. However, when the position of the paper holder falls within the range narrower than the print width of the recording head 56, the above limitation can be eliminated. The position at which the last line remaining width Δ can be printed may be the second to last line.

In the first embodiment, the last line remaining width Δ is displaced as one line. However, the last line remaining width Δ may be obtained by displacement through a plurality of lines.

In the first embodiment described above, the print width of the last line is unconditionally defined as a remaining width, and the print width is displaced upward above the last line. However, the present invention is not limited to this scheme. The print width of the last line may be compared with the print width at the recording head 56. If these print widths are equal to each other, subscanning of all lines may be performed by constant displacement. However, if these print widths are different from each other, subscanning variable displacement may be performed.

In the above embodiments, the present invention is applied to the digital color copying machine. However, the present invention is applicable to a printer having a similar printing mechanism.

As has been described above, according to the image recording apparatus wherein the printing head having a predetermined head print width is scanned a plurality of times in the main scanning direction, and the recording object is displaced in the subscanning direction, thereby forming an image on the object, the print width at the last line is calculated, and the calculated print width is displaced before the last line, and the suction area of the object on the platen is reduced.

There is, therefore, provided an image recording apparatus capable of preventing trouble such as jamming caused by floating of the object at the last line without changing the input mechanism.

What is claimed is:

1. An image recording method for main scanning in a main scanning direction using a recording head having a recording area corresponding to a predetermined recording width in a sub-scanning direction, different from the main scanning direction, and effecting relative movement of the recording head and a recording medium in the sub-scanning direction after termination of main scanning of the recording head, said method comprising the steps of:

determining a remaining width when an image area is divided by the predetermined recording width;

setting a recording width of the recording head in the sub-scanning direction;

effecting relative movement of the recording head and the recording medium by a distance in accordance with the recording width set in said setting step before main scanning of the recording head, the distance being smaller than the predetermined recording width when the remaining width is set in said setting step as the recording width; and recording an image having the recording width by using the recording area of the recording head and by main scanning the recording head in the main scanning direction, after effecting relative movement of the recording head and the recording medium, an image being recorded by using a partial recording area of the recording area of the recording head located upstream with respect to the sub-scanning direction when the remaining width is set as the recording width at said setting step.

2. An image recording method according to claim 1, wherein main scanning of the recording head is performed by reciprocally moving the recording head in the main scanning direction.

3. An image recording method according to claim 1, further comprising using another recording head having a different recording color to record a color image on the recording medium.

4. An image recording method according to claim 1, wherein said determining step comprises determining the recording width in each main scan in accordance with a size of the image to be recorded, and said setting step comprises setting the predetermined recording width and the recording width prior to commencing each main scan.

5. An image recording method according to claim 4, wherein said determining step comprises dividing the image to be recorded by the predetermined recording width in the sub-scanning direction, and if a recording width less than the predetermined recording width remains after the division, said setting step comprises setting the recording width to effect scanning for the recording width less than the predetermined recording width, prior to the final main scan.

6. An image recording method according to claim 4 or 5, wherein said recording step records, as the image, an original image read by a means for reading.

7. An image recording method according to claim 6, wherein said recording step comprises recording an image on the recording medium by discharging ink from a discharge port of the recording head.

8. An image recording method according to claim 7, further comprising discharging the ink from the discharge port of the recording head by causing a state change in the ink by using thermal energy.

9. An image recording method according to any one of claims 1 through 5, wherein said recording step comprises recording an image on the recording medium by discharging ink from a discharge port of the recording head.

10. An image recording method according to claim 9, further comprising discharging the ink from the discharge port of the recording head by causing a state change in the ink by using thermal energy.

11. An image recording apparatus for recording an image on a recording medium by using a recording head having a recording area corresponding to a predetermined recording width in a sub-scanning direction, said apparatus comprising:

scanning means for main scanning the recording head in a main scanning direction;

moving means for effecting relative movement of the recording head and the recording medium in the sub-scanning direction after termination of main scanning of the recording head by said scanning means;

determining means for determining a remaining width when an image area is divided by the predetermined recording width;

setting means for setting a recording width of the recording head in the sub-scanning direction;

movement control means for controlling an amount of relative movement effected by said moving means, in accordance with the recording width set by said setting means, said movement control means effecting relative movement of the recording head and the recording medium by a distance in accordance with the remaining width less than the predetermined recording width before main scanning, when the recording width set by said setting means is the remaining width; and recording control means for controlling the recording head, said recording control means causing the recording head to record an image having the recording width set by said setting means after the relative movement is effected by said moving means, said recording control means causing, when said setting means sets the remaining width as the recording width, the recording head to record an image having the recording width less than the predetermined recording width, by using a partial recording area of the recording area of the recording head located upstream with respect to the sub-scanning direction.

12. An image recording apparatus according to claim 11, wherein said scanning means scans the recording head by reciprocally moving the recording head in the main scanning direction.

13. An image recording apparatus according to claim 11, further comprising another recording head having a different recording color and wherein said recording control means causes the other recording head to record a color image on the recording medium.

14. An image recording apparatus according to claim 11, wherein said determining means determines the recording width for each scan in accordance with a size of the image to be recorded and the predetermined recording width, and said setting means sets the recording width before commencement of each scan.

15. An image recording apparatus according to claim 14, wherein said determining means divides an image to be recorded by the predetermined recording width in the sub-scanning direction, and if a recording width less than the predetermined recording width remains after the division, said setting means sets the recording width to effect the scan for the recording width less than the predetermined recording width before a final scan.

16. An image recording apparatus according to claim 14 or 15, wherein the image to be recorded is an original image, and further comprising reading means for reading the original image.

17. An image recording apparatus according to claim 16, wherein said recording control means causes the recording head to record an image on the recording medium by discharging ink from a discharge port.

18. An image recording apparatus according to claim 17, wherein the recording head causes a state change in the ink by using thermal energy to discharge the ink from the discharge port.

19. An image recording apparatus according to any one of claims 11 through 15, wherein said recording control means causes the recording head to record an image on the recording medium by discharging ink from a discharge port.

20. An image recording apparatus according to claim 19, wherein the recording head causes a state change in the ink by using thermal energy to discharge the ink from the discharge port.

* * * * *

UNITED STATES PATENT AND TRADEMARK OFFICE
CERTIFICATE OF CORRECTION

PATENT NO. : 5,635,963  Page 1 of 2
DATED : June 3, 1997
INVENTOR(S) : Keiju KUBOKI It is certified that error appears in the above-indentified patent and that said Letters Patent is hereby corrected as shown below:

COLUMN 2:

Line 32, "a" should be deleted.

COLUMN 3:

Line 7, "width A" should read --width $\Delta$--;

Line 22, "width A" should read --width $\Delta$--.

COLUMN 6:

Line 59, "Operation" should read --operation--.

COLUMN 8:

Line 23, "width A" should read --width $\Delta$--.

UNITED STATES PATENT AND TRADEMARK OFFICE
CERTIFICATE OF CORRECTION

PATENT NO. : 5,635,963         Page 2 of 2
DATED      : June 3, 1997
INVENTOR(S): Keiju KUBOKI It is certified that error appears in the above-indentified patent and that said Letters Patent is hereby corrected as shown below:

COLUMN 10:

Line 34, "Constant" should read --constant--.

COLUMN 11:

Line 59, "A" should read --Δ--.

Signed and Sealed this

Twenty-third Day of June, 1998

Attest:

BRUCE LEHMAN

Attesting Officer     Commissioner of Patents and Trademarks